United States Patent
Okada et al.

(10) Patent No.: US 10,906,380 B2
(45) Date of Patent: Feb. 2, 2021

(54) EVAPORATOR WITH COLD STORAGE FUNCTION

(71) Applicant: MARELLI CABIN COMFORT JAPAN CORPORATION, Saitama (JP)

(72) Inventors: Takehito Okada, Saitama (JP); Sachio Koyama, Saitama (JP); Takaya Arimoto, Saitama (JP); Yoshinori Ishida, Saitama (JP); Kazuo Nakajo, Saitama (JP)

(73) Assignee: MARELLI CABIN COMFORT JAPAN CORPORATION, Saitama (JP)

( * ) Notice: Subject to any disclaimer, the term of this patent is extended or adjusted under 35 U.S.C. 154(b) by 156 days.

(21) Appl. No.: 16/083,625

(22) PCT Filed: Mar. 7, 2017

(86) PCT No.: PCT/JP2017/008963
§ 371 (c)(1),
(2) Date: Sep. 10, 2018

(87) PCT Pub. No.: WO2017/154889
PCT Pub. Date: Sep. 14, 2017

(65) Prior Publication Data
US 2019/0077227 A1 Mar. 14, 2019

(30) Foreign Application Priority Data
Mar. 11, 2016 (JP) .................................. 2016-048410
Mar. 11, 2016 (JP) .................................. 2016-048414

(51) Int. Cl.
*F25B 39/02* (2006.01)
*B60H 1/32* (2006.01)
(Continued)

(52) U.S. Cl.
CPC .......... *B60H 1/3202* (2013.01); *B60H 1/005* (2013.01); *B60H 1/00335* (2013.01);
(Continued)

(58) Field of Classification Search
CPC .. B60H 1/3202; B60H 1/00335; B60H 1/005; B60H 1/3204; B60H 1/00499;
(Continued)

(56) References Cited

U.S. PATENT DOCUMENTS 4,589,265 A  5/1986 Nozawa
5,417,280 A  5/1995 Hayashi et al.
(Continued)

FOREIGN PATENT DOCUMENTS

CN  105135757 A  12/2015
EP  2 960 612 A1  12/2015
(Continued)

*Primary Examiner* — Henry T Crenshaw
*Assistant Examiner* — Kamran Tavakoldavani
(74) *Attorney, Agent, or Firm* — Foley & Lardner LLP

(57) ABSTRACT

An evaporator with a cold storage function includes: a plurality of refrigerant tubes which have refrigerant flow paths and which are disposed in parallel with an interval therebetween; and a cold storage material container sandwiched and bonded between adjacent refrigerant tubes among a plurality of the refrigerant tubes and to be filled with a cold storage material, wherein the cold storage material container is formed by superimposing a pair of cold storage plates, each of which includes accommodating concavities to be filled with the cold storage material, and a plurality of convexities are formed with an interval therebetween in standing walls of the accommodating concavities of each of the cold storage plates.

5 Claims, 13 Drawing Sheets

(51) Int. Cl.
  *F28D 20/02* (2006.01)
  *F28D 1/03* (2006.01)
  *B60H 1/00* (2006.01)
  *F28D 9/00* (2006.01)
  *F28D 20/00* (2006.01)
  *F28D 21/00* (2006.01)

(52) U.S. Cl.
  CPC ............ *F25B 39/02* (2013.01); *F28D 1/0308* (2013.01); *F28D 1/0316* (2013.01); *F28D 1/0333* (2013.01); *F28D 9/0006* (2013.01); *F28D 9/0037* (2013.01); *F28D 20/02* (2013.01); *B60H 2001/3289* (2013.01); *F28D 2020/0013* (2013.01); *F28D 2021/0085* (2013.01); *Y02E 60/14* (2013.01)

(58) Field of Classification Search
  CPC ........ B60H 1/00492; B60H 2001/3289; F25B 39/02; F25B 39/022; F28D 1/0308; F28D 1/0316; F28D 1/0333; F28D 20/02; F28D 9/0006; F28D 9/0037; F28D 2020/0013; F28D 2020/0008; F28D 2020/0004; F28D 2021/0085; F24F 5/0021
  See application file for complete search history.

(56) References Cited

U.S. PATENT DOCUMENTS 9,829,255 B2 * 11/2017 Moreau ................. F28D 1/0341
2015/0068718 A1    3/2015 Ota et al.

FOREIGN PATENT DOCUMENTS

| | | | |
|---|---|---|---|
| FR | 3014183 A1 * | 6/2015 | ........... F28D 1/0341 |
| JP | S60-82170 U | 6/1985 | |
| JP | H06-074608 A | 3/1994 | |
| JP | 2010-243066 A | 10/2010 | |
| JP | 2011-006058 A | 1/2011 | |
| JP | 2014-024436 A | 2/2014 | |
| JP | 2014-180913 A | 9/2014 | |
| JP | 2015-107694 A | 6/2015 | |
| JP | 5796530 B2 | 10/2015 | |
| JP | 2015-200477 A | 11/2015 | |
| KR | 1020120067406 A | 6/2012 | |
| WO | WO 2013-125533 A1 | 8/2013 | |
| WO | WO 2014/202523 A1 | 12/2014 | |

* cited by examiner

EVAPORATOR WITH COLD STORAGE FUNCTION

TECHNICAL FIELD

The present invention relates to an evaporator with a cold storage function and including a cold storage material container that is sandwiched between adjacent refrigerant tubes and that is to be filled with a cold storage material.

BACKGROUND ART

Some of vehicles have the so-called idle stop function to achieve an improvement in fuel consumption by temporarily stop of an engine during temporary stop of the vehicle, such as in waiting for a traffic light to change. In such a vehicle, when the air-conditioner is operating, the engine will stop due to the idle stop function, and as the result driving of the compressor of an air conditioning system driven by an engine power will also stop. Then, the circulation of the refrigerant used in the system will also stop, resulting in failure in exhibiting the cooling capability Then, in order to enable to supply a cold air into the vehicle interior even during temporary stop of an engine, an evaporator with a cold storage function is used, the evaporator including a cold storage material and enabling heat exchange between this cold storage material and refrigerant so as to store a low temperature heat into the cold storage material in advance, and allowing the low temperature heat of the cold storage material to be used for cooling during idle stop. As such an evaporator with a cold storage function, the one described in Patent Literature 1 is known, for example.

The evaporator with a cold storage function in Patent Literature 1 includes: a plurality of refrigerant tubes which are disposed in parallel with an interval therebetween; and a cold storage material container sandwiched between adjacent refrigerant tubes among a plurality of the refrigerant tubes and filled with a cold storage material. Here, the evaporator of a refrigeration cycle apparatus is made to have a cold storage function to store low temperature heat during traveling of a vehicle. This cold air is used while the vehicle is being stopped. That is, each refrigerant tube is formed in a flat shape, and has a refrigerant flow path therein, and the cold storage material container disposed in parallel with and bonded to the refrigerant tubes has a wide flat surface in both side faces. On the bonding side in the both side faces, a plurality of convexities are projected and formed in an inclined shape so that the condensed water or ice produced at the time of cold storing is easily discharged. Moreover, an inner fin is mounted in the cold storage material container.

CITATION LIST

Patent Literature

Patent Literature 1: Japanese Patent No. 5796530

SUMMARY OF INVENTION

Technical Problem

In the evaporator with a cold storage function of Patent Literature 1, a plurality of convexities are formed on the bonding side in the both side faces, each of which has a flat surface, of the cold storage material container. However, in a plurality of convexities on this bonding side, the strength (stiffness) in the thickness direction between both side faces, each of which has a flat surface, of the cold storage material container is weak, so deformation such as dent, tends to occur in both side faces (contact surfaces with respect to the refrigerant tube), each of which has a flat surface, of the cold storage material container.

Then, the present invention has been made to solve the above problems, and is intended to provide an evaporator with a cold storage function, the evaporator being capable of securing, with a simple structure, the stiffness of the side face of a cold storage material container which is the contact surface with respect to a refrigerant tube and being capable of reliably prevent the deformation of the side face of the cold storage material container.

Solution to Problem

According to an aspect of the present invention, there is provided an evaporator with a cold storage function, the evaporator including: a plurality of refrigerant tubes which have refrigerant flow paths and which are disposed in parallel with an interval therebetween; and a cold storage material container sandwiched and bonded between adjacent refrigerant tubes among a plurality of the refrigerant tubes and filled with a cold storage material. Here, the cold storage material container is formed by superimposing a pair of cold storage plates, each of which includes an accommodating concavity to be filled with the cold storage material, and a plurality of convexities are formed with an interval therebetween in a standing wall of the accommodating concavity of each of the cold storage plates.

DESCRIPTION OF EMBODIMENTS

Hereinafter, embodiments of the present invention will be described based on the accompanying drawings.

Figure 1:
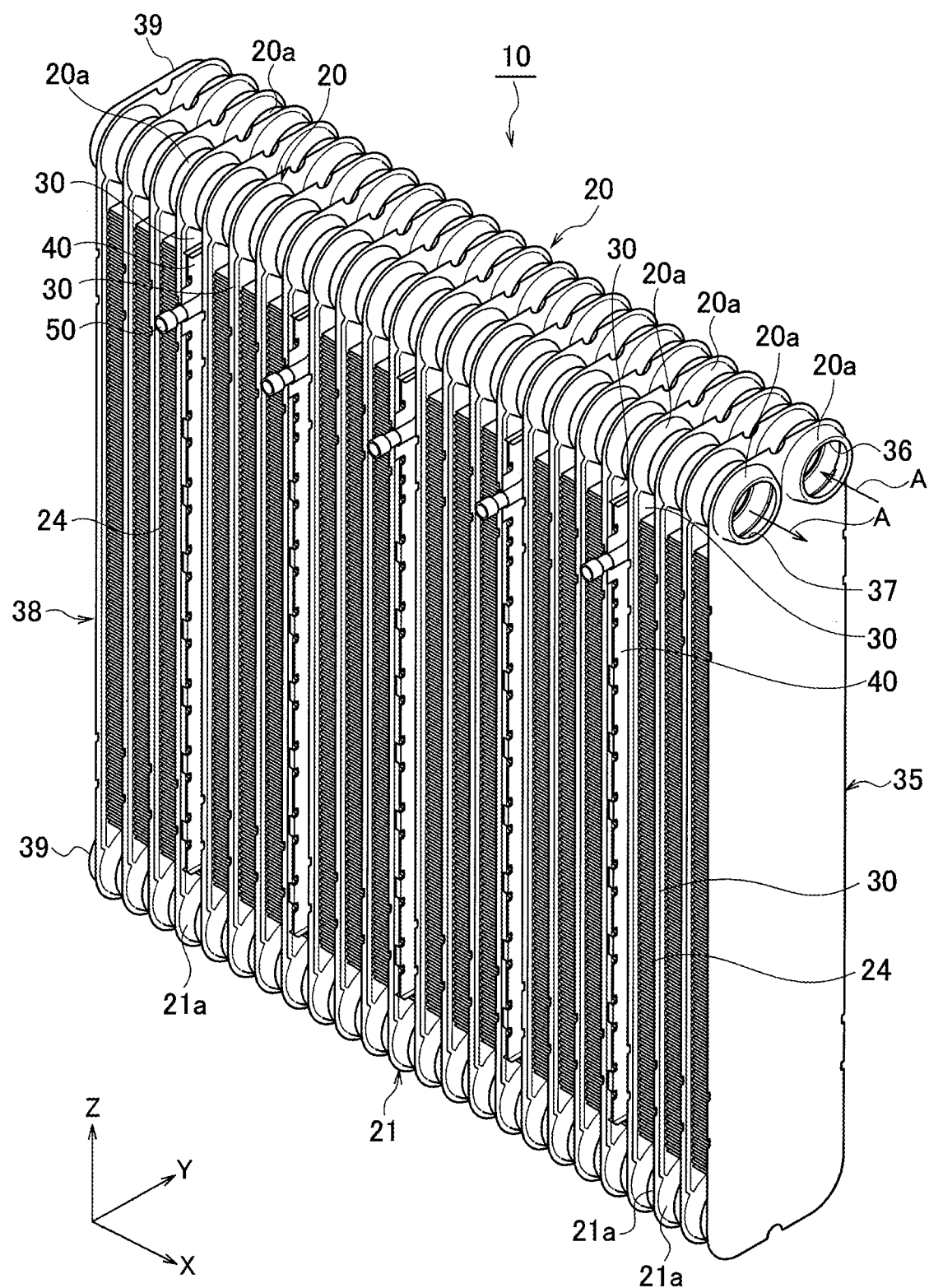
FIG. 1 is a perspective view illustrating an evaporator with a cold storage function according to an embodiment of the present invention.
Figure 2:
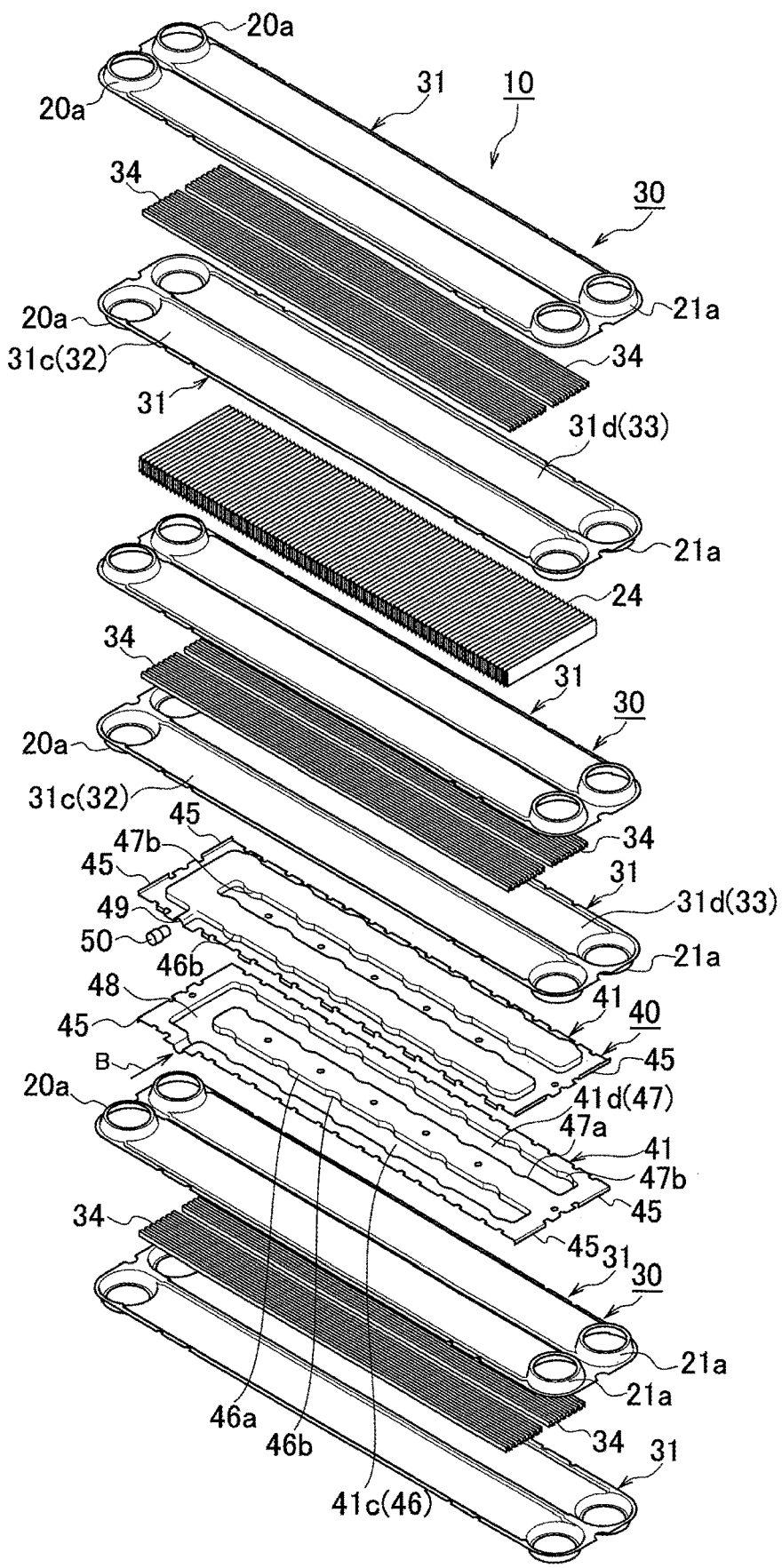
FIG. 2 is an exploded perspective view of a main portion of the above-described evaporator with a cold storage function.
Figure 3:
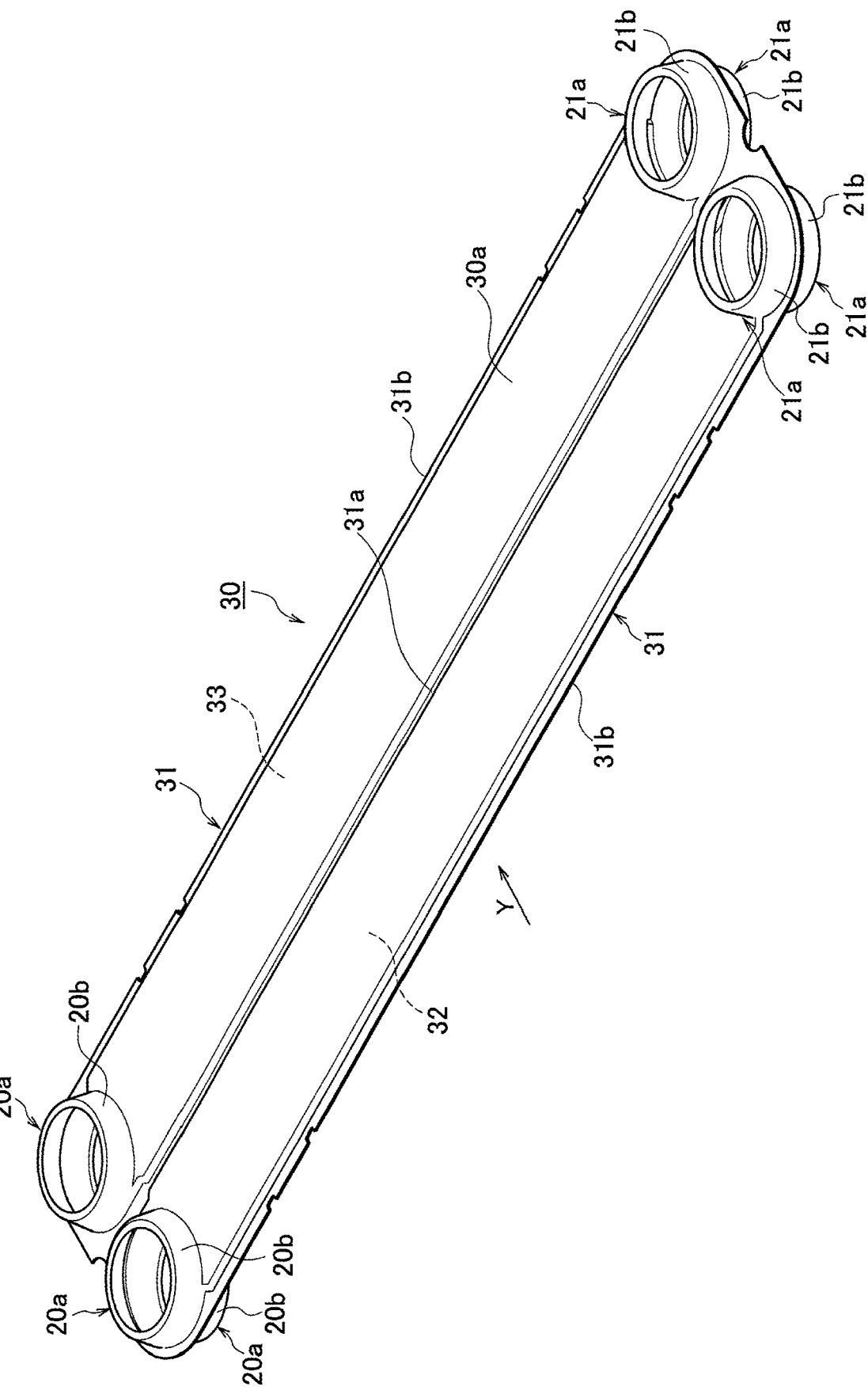
FIG. 3 is a perspective view of a refrigerant tube to be used for the above-described evaporator with a cold storage function.
Figure 4:
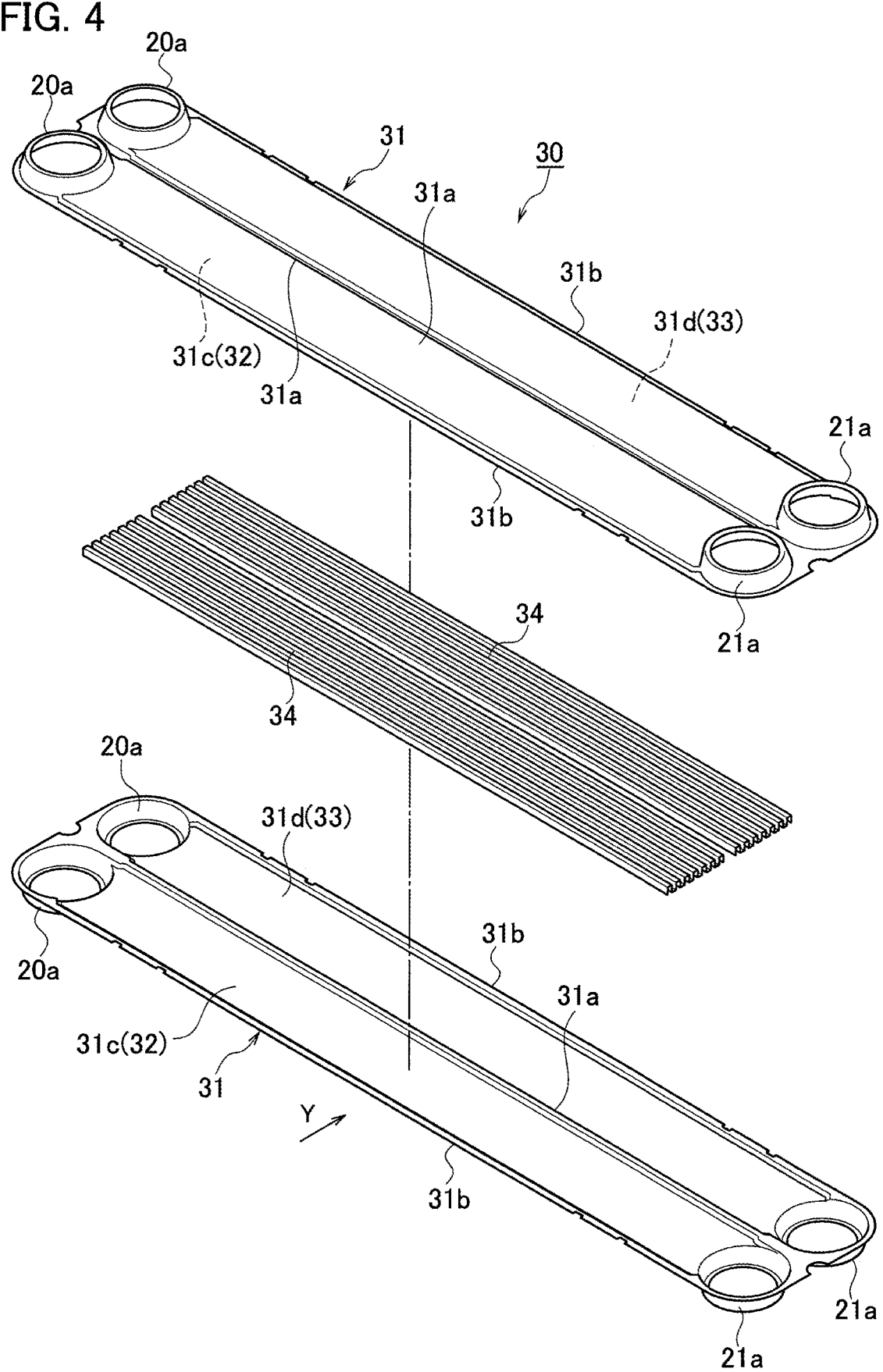
FIG. 4 is an exploded perspective view of the above-described refrigerant tube.
Figure 5:
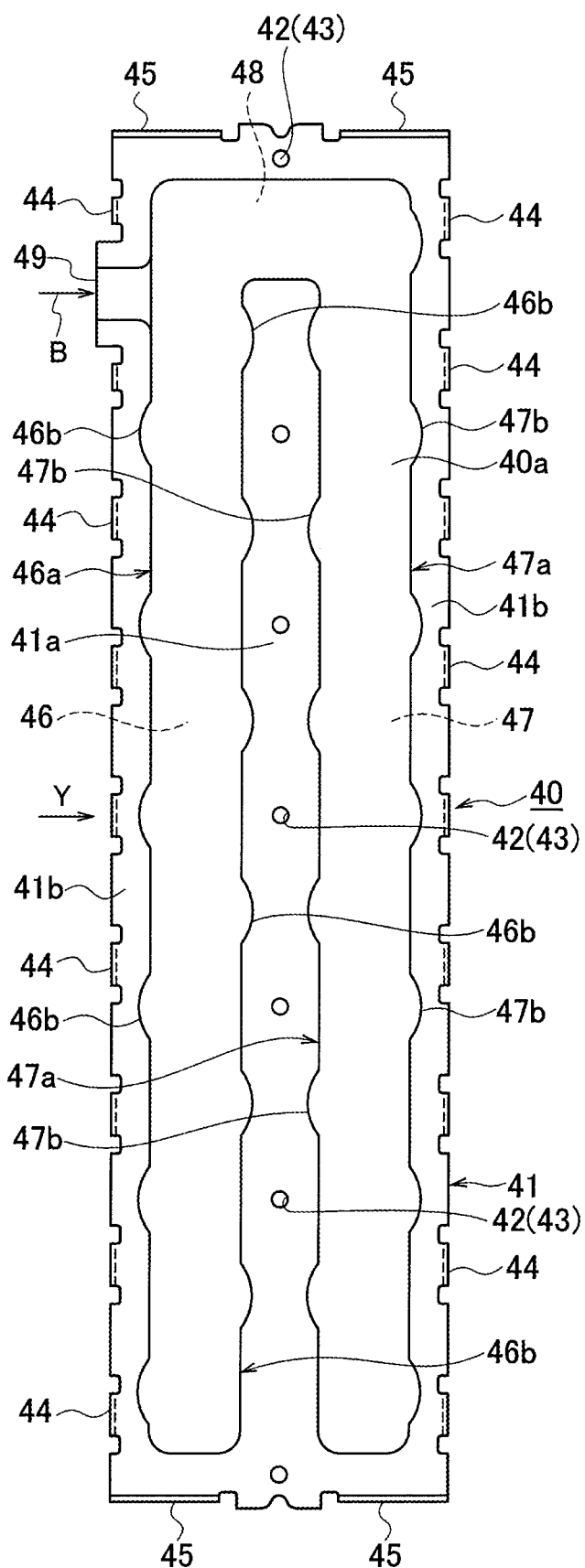
FIG. 5 is a side view of a cold storage material container to be used for the above-described evaporator with a cold storage function.
Figure 6:
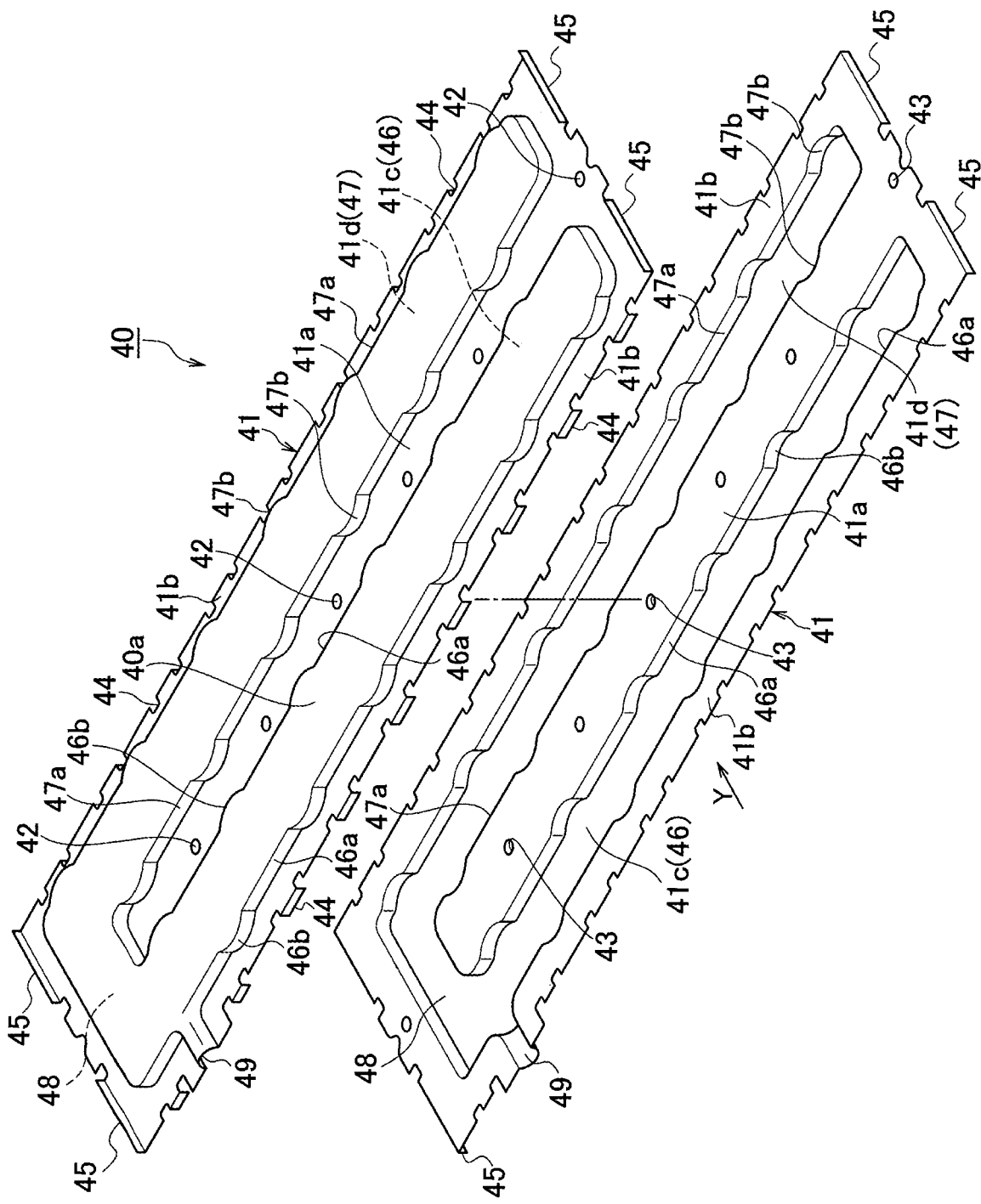
FIG. 6 is an exploded perspective view of the above-described cold storage material container.
Figure 7:
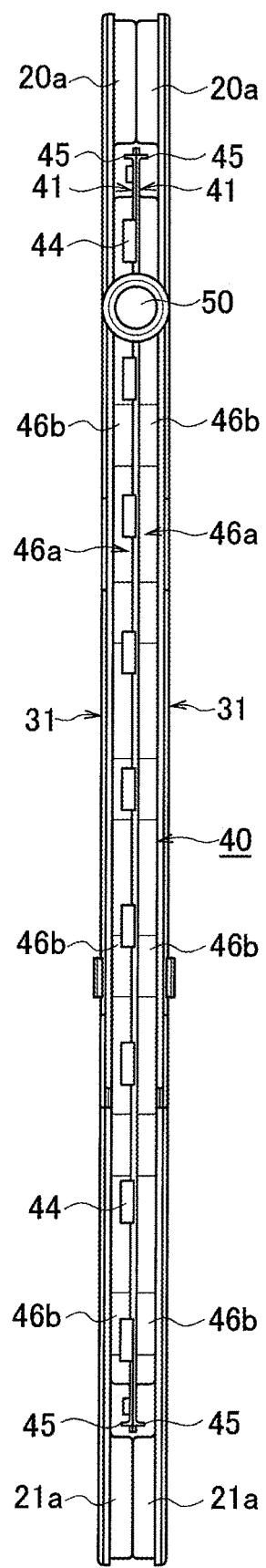
FIG. 7 is a front view illustrating the cold storage material container sandwiched between the refrigerant plates of adjacent refrigerant tubes.
Figure 8:
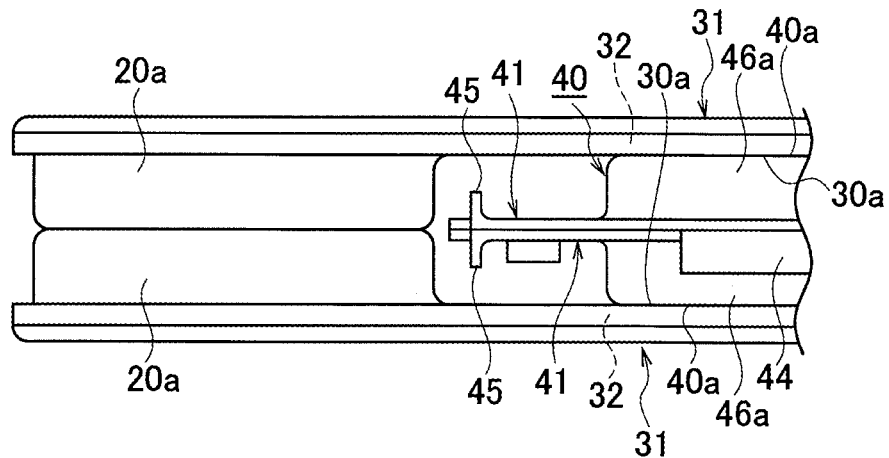
FIG. 8 is a partial front view magnifying a main portion of the cold storage material container sandwiched between the above-described adjacent refrigerant tubes.
Figure 9:
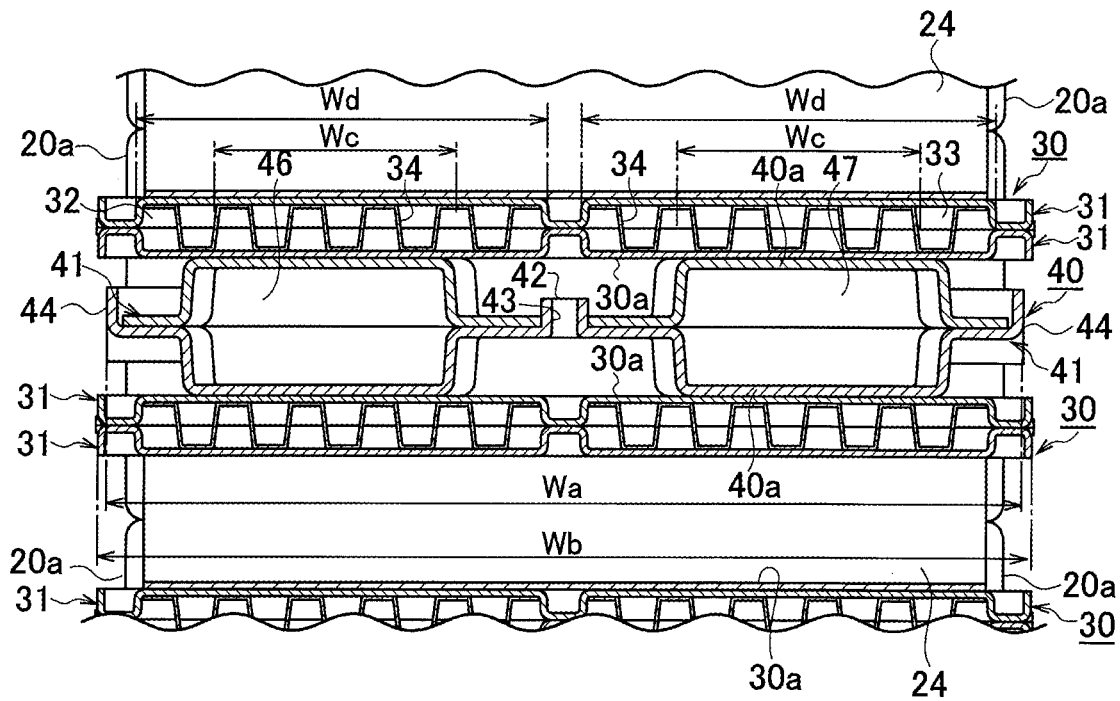
FIG. 9 is a cross sectional view of a main portion of the above-described evaporator with a cold storage function.
Figure 10:
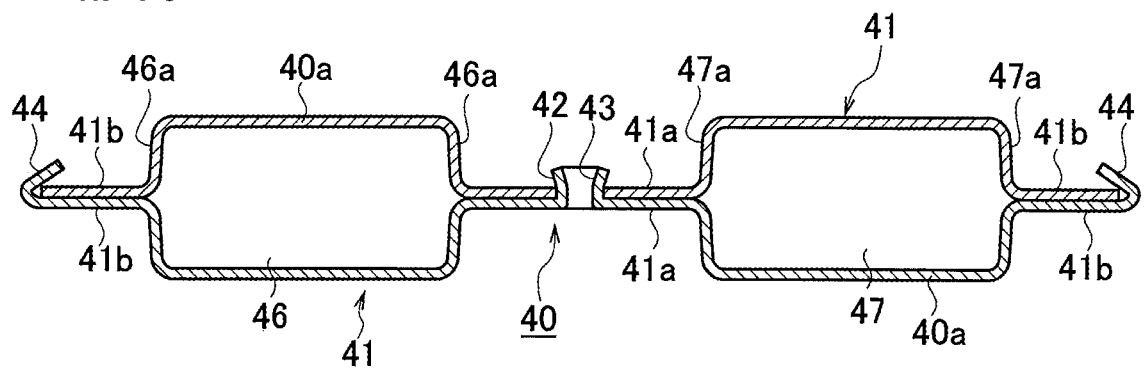
FIG. 10 is a cross sectional view illustrating a bonding state of a pair of cold storage plates constituting the above-described cold storage material container.
Figure 11:
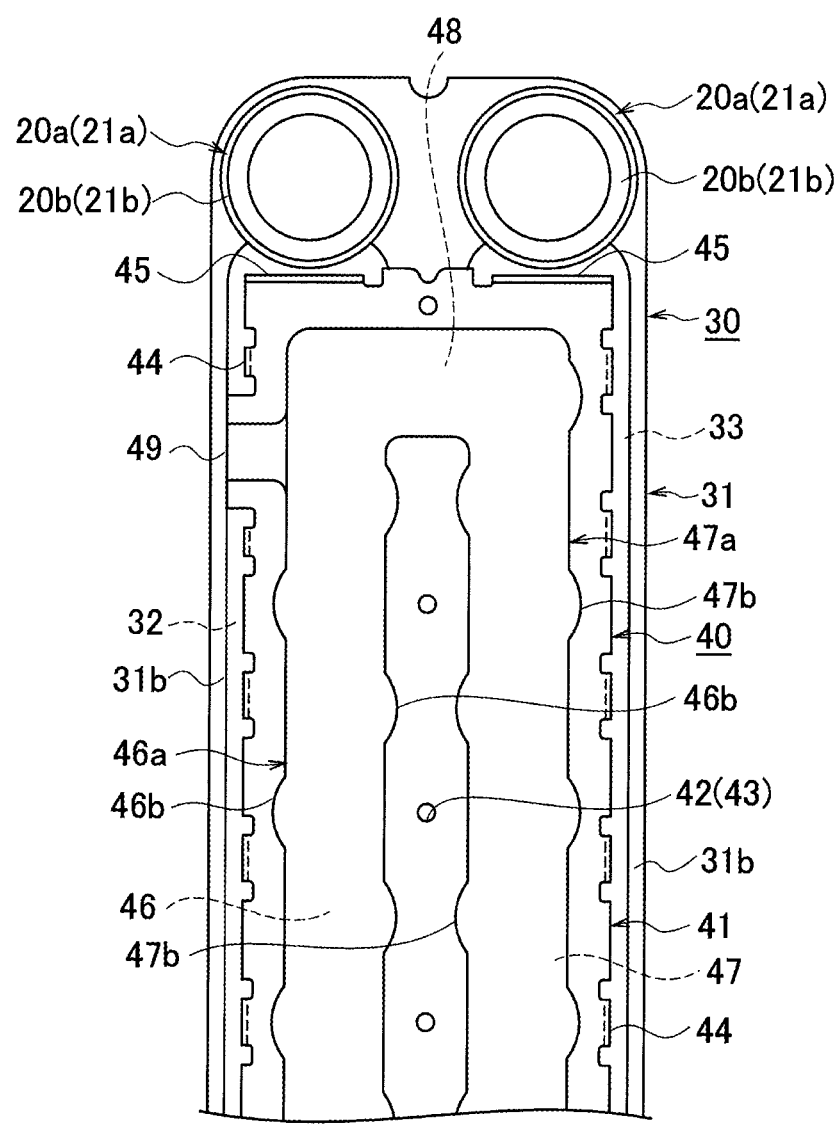
FIG. 11 is a partial side view illustrating a relationship between a tank forming section at an end of the above-described refrigerant tube and an end of the cold storage material container.

FIG. 1 is a perspective view illustrating an evaporator with a cold storage function according to an embodiment of the present invention. FIG. 2 is an exploded perspective view of a main portion of the above-described evaporator with a cold storage function. FIG. 3 is a perspective view of the refrigerant tube to be used for the above-described evaporator with a cold storage function. FIG. 4 is an exploded perspective view of the above-described refrigerant tube. FIG. 5 is a side view of a cold storage material container to be used for the above-described evaporator with a cold storage function. FIG. 6 is an exploded perspective view of the above-described cold storage material container. FIG. 7 is a front view illustrating the cold storage material container sandwiched between the refrigerant plates of adjacent refrigerant tubes. FIG. 8 is a partial front view magnifying a main portion of the cold storage material container sandwiched between the above-described adjacent refrigerant tubes. FIG. 9 is a cross sectional view of a main portion of the above-described evaporator with a cold storage function. FIG. 10 is a cross sectional view illustrating a bonding state of a pair of cold storage plates constituting the above-described cold storage material container. FIG. 11 is a partial side view illustrating a relationship between a tank forming section at an end of the above-described refrigerant tube and an end of the cold storage material container.

As illustrated in FIG. 1 and FIG. 2, an evaporator with a cold storage function 10 includes: a plurality of refrigerant tubes 30 which have refrigerant flow paths 32, 33 and which are disposed in a lateral direction X in parallel with an interval therebetween; and a cold storage material container 40 sandwiched and bonded between adjacent refrigerant tubes 30, 30 among a plurality of the refrigerant tubes 30 and filled with a cold storage material B. The evaporator 10 maintains the cooling capability by releasing the low temperature heat, which is cooled by a refrigerant A and stored in the cold storage material B in the cold storage material container 40, even if a compressor driven by the engine is stopped since the engine is stopped by an idle stop function. Note that, an arrow Y in FIG. 1 indicates the ventilation airflow direction of an air-conditioner, an arrow Z indicates the vertical direction perpendicular to the ventilation airflow direction Y, and an arrow X indicates the lateral direction.

As illustrated in FIG. 2 to FIG. 4, the refrigerant tube 30 includes: a pair of tank forming sections 20a, 20a and a pair of tank forming sections 21a, 21a, respectively, formed in a cylindrical shape on both sides in the vertical direction Z perpendicular to the ventilation air flow direction Y; a pair of refrigerant plates (metallic thin plates) 31, 31 having formed thereinside refrigerant flow paths 32, 33 in communication with each of the tank forming sections 20a, 21a by integrally forming and superimposing these respective pairs of tank forming sections 20a, 20a and pair of tank forming sections 21a, 21a; and heat exchange facilitators (inner fin) 34, 34 which is housed in each of the refrigerant flow paths 32, 33 of the pair of refrigerant plates 31, 31 to facilitate heat exchange. The refrigerant tube 30 cools ventilation air by circulating the refrigerant A, which is flowed into each of the tank forming sections 20a, 21a, inside the refrigerant flow paths 32, 33 and performing heat exchange between the refrigerant A and the ventilation air flowing around the outer circumference of the pair of refrigerant plates 31, 31.

As illustrated in FIG. 3 and FIG. 4, the refrigerant tube 30 is formed by superimposing the pair of refrigerant plates 31, 31 with the heat exchange facilitator 34, 34 sandwiched therebetween. In the pair of refrigerant plates 31, 31, bonding sections 31b in the peripheral side are bonded together and partitions 31a in the center are bonded together. Moreover, between the partition 31a in the center and the bonding section 31b in the peripheral side of each of the refrigerant plates 31, a first heat exchange passage concavity 31c and a second heat exchange passage concavity 31d are formed in parallel. Thus, inside the refrigerant tube 30 formed by superimposing the pair of refrigerant plates 31, 31, a first refrigerant flow path 32 and a second refrigerant flow path 33 for flowing the refrigerant A therethrough are formed across the partition 31a in the center of each of the refrigerant plates 31. Moreover, the heat exchange facilitator 34 is housed in each of the refrigerant flow paths 32, 33. Furthermore, both ends of each of the refrigerant flow paths 32, 33 are communicated with each of the pair of tank forming sections 20a, 20a and the pair of tank forming sections 21a, 21a integrally formed at the upper and lower ends of each of the pair of refrigerant plates 31. Note that, the first refrigerant flow path 32 is disposed on the windward side in the ventilation airflow direction, while the second refrigerant flow path 33 is disposed on the leeward side in the ventilation airflow direction.

As illustrated in FIG. 1, the pair of tank forming sections 20a, 20a and the pair of tank forming sections 21a, 21a integrally formed on both end sides of the pair of refrigerant plates 31, 31 are formed so as to cylindrically protrude outward in the stacking direction in the lateral direction X. A plurality of tank forming sections 20a and a plurality of tank forming sections 21a are stacked, respectively, so that pairs of tanks 20, 20 for a refrigerant flow path and pairs of tanks 21, 21 for a refrigerant flow path are laterally formed back and forth as well as above and below on both end sides, respectively, in a vertical direction Z of a plurality of refrigerant tubes 30, 30.

Moreover, as illustrated in FIG. 1, only on the upper end side, the pair of tank forming sections 20a, 20a cylindrically protruding outward in the stacking direction are integrally formed with the refrigerant plate 35 on the right side. Of the pair of tank forming sections 20a, 20a, the tank forming section 20a on the downstream side in the ventilation airflow direction serves a refrigerant inlet 36 for introducing the refrigerant A, while the tank forming section 20a on the upstream side in the ventilation airflow direction serves as a refrigerant outlet 37 for leading out the refrigerant A. Furthermore, a communicating section 39 in communication with each of the tank forming sections 20a, 21a integrally formed with the upper and lower ends of each refrigerant tube 30, the communicating section 39 being provided in at least one of the upper and lower ends of each refrigerant tube 30, is integrally formed with the upper and lower ends of the refrigerant plate 38 on the left end side. Note that an outer fin 24 for facilitating heat exchange with the ventilation air is sandwiched and bonded between the adjacent refrigerant tubes 30, 30 without the cold storage material container 40 interposed therebetween.

As illustrated in FIG. 5 and FIG. 6, the cold storage material container 40 is formed by superimposing a pair of cold storage plates (metal plates) 41, 41, each of which includes accommodating concavities 46, 47 to be filled with the cold storage material B. For example, the cold storage material container 40 is for complementarily cooling the ventilation air by performing heat exchange between the cold storage material B and the ventilation air during idle stop using the low temperature heat stored in the cold storage material B.

In the pair of cold storage plates 41, 41, bonding sections 41b in the peripheral side are bonded together and partitions 41a in the center are bonded together, respectively. In the partitioning section 41a in the center of one of the pair of cold storage plates 41, 41, a plurality of cylindrical projections (locking parts) 42 are integrally formed with an interval therebetween so as to protrude toward the other one of the pair of cold storage plates 41, while a circular hole (engaging part) 43 is formed at a position facing each of the projections 42 of the partitioning section 41a in the center of the other cold storage plate 41. Moreover, on both end sides in the width direction of the bonding section 41b in the peripheral side of one of the cold storage plates 41, a plurality of bending sections 44, which are bent in an L shape toward the other cold storage plate 41, are disposed with an interval therebetween. Then, as illustrated in FIG. 10, each cylindrical projection 42 of one of the cold storage plates 41 is fitted and clamped into each circular hole 43 of the other cold storage plate 41 and each bending section 44 of one of the cold storage plates 41 is clamped toward the bonding section 41b in the peripheral side of the other one of the cold storage plates 41, so that the pair of cold storage plates 41, 41 are positioned and bonded. Note that, although the cylindrical projection 42 is integrally formed with the partitioning section 41a in the center of one of the cold storage plates 41, the projection 42 may be integrally formed in a columnar shape.

As illustrated in FIG. 5 to FIG. 8 and FIG. 11, on both ends in the vertical direction Z of the pair of cold storage plates 41, 41, a pair of bending sections (stoppers) 45, 45 which abut against and restrict the position of the cylindrical surfaces 20b, 21b of each of the tank forming sections 20a, 21a on both end sides in the vertical direction Z of the pair of refrigerant plates 31, 31 are bent and formed in an L shape so as to protrude outward.

Moreover, as illustrated in FIG. 5 and FIG. 6, a first accommodating concavity 41c and a second accommodating concavity 41d are formed between the partitioning section 41a in the center of each of the cold storage plates 41 and the bonding section 41b in the peripheral side. Thus, inside the cold storage material container 40 formed by superimposing the pair of cold storage plates 41, 41, the first accommodating concavity 46 and second accommodating concavity 47 for storing the cold storage material B are formed in parallel across the partitioning section 41a in the center of each of the pair of cold storage plates 41, 41. This first accommodating concavity 46 is disposed on the windward side in the ventilation airflow direction, while the second accommodating concavity 47 is disposed on the leeward side in the ventilation airflow direction.

Furthermore, a plurality of arc-shaped convexities (projections) 46b, 47b protruding outward are integrally formed, with an interval therebetween, with standing walls 46a, 47a of the first and second accommodating concavities 46, 47 of the cold storage material container 40. A plurality of arc-shaped convexities 46b, 47b protruding outward, which are formed at positions where the standing walls 46a, 47a of the accommodating concavities 46, 47 face each other, are formed so as to be disposed in a zigzag manner, as illustrated in FIG. 5.

Moreover, the first accommodating concavity 46 and the second accommodating concavity 47 are communicated with each other via a communicating section 48 on the upper side of each of the cold storage plates 41. Furthermore, at a position facing the communicating section 48 on the windward side in the ventilation air flow direction of the bonding section 41b in the peripheral side of each of the cold storage plates 41, a cold storage material inlet 49 to be filled with the cold storage material B is formed. This cold storage material inlet 49 is to be closed with a plug 50.

Furthermore, as illustrated in FIG. 9, a width Wa of the cold storage plate 41 of the cold storage material container 40 is formed smaller than a width Wb of the refrigerant plate 31 of the refrigerant tube 30. Moreover, a width Wc of each of the accommodating concavities 46, 47 of the cold storage plate 41 of the cold storage material container 40 is formed smaller than a width Wd of each of the refrigerant flow paths 32, 33 of the refrigerant tube 30.

In the evaporator with a cold storage function 10 configured as described above, all components are made of aluminum or an aluminum alloy, the respective components are stacked, and pressed by pressing, and the respective components are integrated by brazing while being in surface contact with each other. Moreover, for example HFC-134a or the like is used as the refrigerant A, while paraffin or the like is used as the cold storage material B.

In the evaporator with a cold storage function 10 of the above embodiment, as illustrated in FIG. 9, a side face 40a of the cold storage material container 40 is stacked on a side face 30a of the refrigerant tube 30, and the side face 30a of the refrigerant tube 30 is stacked on the side face 40a of this cold storage material container 40. In a state where a plurality of refrigerant tubes 30 and a plurality of cold storage material containers 40 are stacked each other in this manner, the refrigerant tube 30 and cold storage material container 40 are pressed by pressing, so that the side face 30a of the refrigerant tube 30 and the side face 40a of the cold storage material container 40 are brought into surface contact with each other and integrated by brazing.

The refrigerant tube 30 used for this evaporator with a cold storage function 10 includes: the pair of tank forming sections 20a, 20a and pair of tank forming sections 21a, 21a respectively formed in a cylindrical shape on both end sides in the vertical direction; the pair of refrigerant plates 31, 31 having formed therein the refrigerant flow paths 32, 33 in communication with the pairs of tank forming sections 20a, 20a and 21a, 21a by integrally forming and superimposing the pair of tank forming sections 20a, 20a and pair of tank forming sections 21a, 21a; and the heat exchange facilitator 34 which is housed in each of the refrigerant flow paths 32, 33 of the pair of refrigerant plates 31, 31 to facilitate heat exchange. Accordingly, by the amount that the pair of tank forming sections 20a, 20a and the pair of tank forming sections 21a, 21a are integrally formed on both end sides, respectively, in the vertical direction of the pair of refrigerant plates 31, 31, the number of components of the evaporator can be reduced and the evaporator can be manufactured at lower cost, and the heat exchange facilitator 34 can be reliably brought into contact with the inner surface of the pair of refrigerant plates 31, 31 constituting each of the refrigerant flow paths 32, 33, and the heat exchange can be further facilitated, Moreover, the cold storage material container 40 is formed by superimposing the pair of cold storage plates 41, 41, each of which includes the accommodating concavities 46, 47 to be filled with the cold storage material B, and a plurality of convexities 46b, 47b are formed in a circular shape so as to protrude outward with an interval therebetween in the standing walls 46a, 47a of the accommodating concavities 46, 47 of each of the cold storage plates 41. Furthermore, a plurality of convexities 46b, 47b, which are formed in a circular shape so as to protrude outward at positions where the standing walls 46a, 47a of the accommodating concavities 46, 47 face each other, are formed so as to be disposed in a zigzag manner. As the result, with a simple structure, in which a plurality of convexities 46b, 47b are formed in a zigzag in the standing walls 46a, 47a, a high stiffness of the side face 40a of the cold storage material container 40 which is the contact surface with respect to the refrigerant tube 30 can be secured and deformation such as dent, in the side face 40a of the cold storage material container 40 can be reliably prevented. Thus, occurrence of air entrapment between the side face 30a of the refrigerant tube 30 and the side face 40a of the cold storage material container 40 can be suppressed and occurrence of frost bursting can be suppressed.

Moreover, as illustrated in FIG. 9, the width Wa of the cold storage plate 41 of the cold storage material container 40 is formed smaller than the width Wb of the refrigerant plate 31 of the refrigerant tube 30, so that the cold storage plate 41 of the cold storage material container 40 can be easily and reliably housed within the width of the refrigerant plate 31 of the refrigerant tube 30. Therefore, the evaporator with a cold storage function 10 can be manufactured easily.

Furthermore, the width Wc of each of the accommodating concavities 46, 47 of the cold storage material container 40 is formed smaller than the width Wd of each of the refrigerant flow paths 32, 33 of the refrigerant tube 30, so that the stiffness of the side face 40a of the cold storage material container 40 in surface contact with the side face 30a of the refrigerant tube 30 can be secured, and deformation such as dent, in the side face 40a of the cold storage material container 40 can be prevented. As the result, the side face 30a of the refrigerant tube 30 and the side face 40a of the cold storage material container 40 can be securely brought into contact with each other and easily bonded to each other by brazing.

Furthermore, as illustrated in FIG. 5 and FIG. 6, the first accommodating concavity 46 is formed on the windward side in the ventilation airflow direction of the cold storage plate 4 of the cold storage material container 40, while the second accommodating concavity 47 is formed on the leeward side, so that the side face 30a facing each of the refrigerant flow paths 32, 33 of the refrigerant tube 30 can be independently pressed. Moreover, these first accommodating concavity 46 and second accommodating concavity 47 are communicated with each other via the communicating section 48 located on the upper side, so that water such as condensed water, produced during cold storage can be prevented from being pooled on the outside of the first accommodating concavity 46 and on the outside of the second accommodating concavity 47.

Moreover, as illustrated in FIG. 11, the bending sections 45, 45, which abut against and restrict the position of the cylindrical surfaces 20b, 21b of each of the tank forming sections 20a, 21a on the both sides in the vertical direction of the pair of refrigerant plates 31, 31 of the refrigerant tube 30, are formed, respectively, at both ends in the vertical direction of the pair of cold storage plates 41, 41 of the cold storage material container 40, so that the both ends of the pair of cold storage plates 41, 41 of the cold storage material container 40 can be securely prevented from being stuck between the superimposing portions of the adjacent tank forming sections 20a, 21a of the refrigerant tube 30. Thus, water such as condensed water, produced during cold storage is drained through a gap between each of the tank forming sections 20a, 21a of the refrigerant tube 30 and the bending sections 45, 45 of the cold storage material container 40, so that retention of condensed water can be suppressed.

Furthermore, the bending sections 45, 45 formed by bending the both ends in the vertical direction of the pair of cold storage plates 41, 41 serve as a stopper, so that with a simple structure formed just by bending the both ends of the cold storage plate 41, a stopper which abuts against and restricts the position of each of the tank forming sections 20a, 21a of the refrigerant tube 30 can be easily formed.

Figure 12:
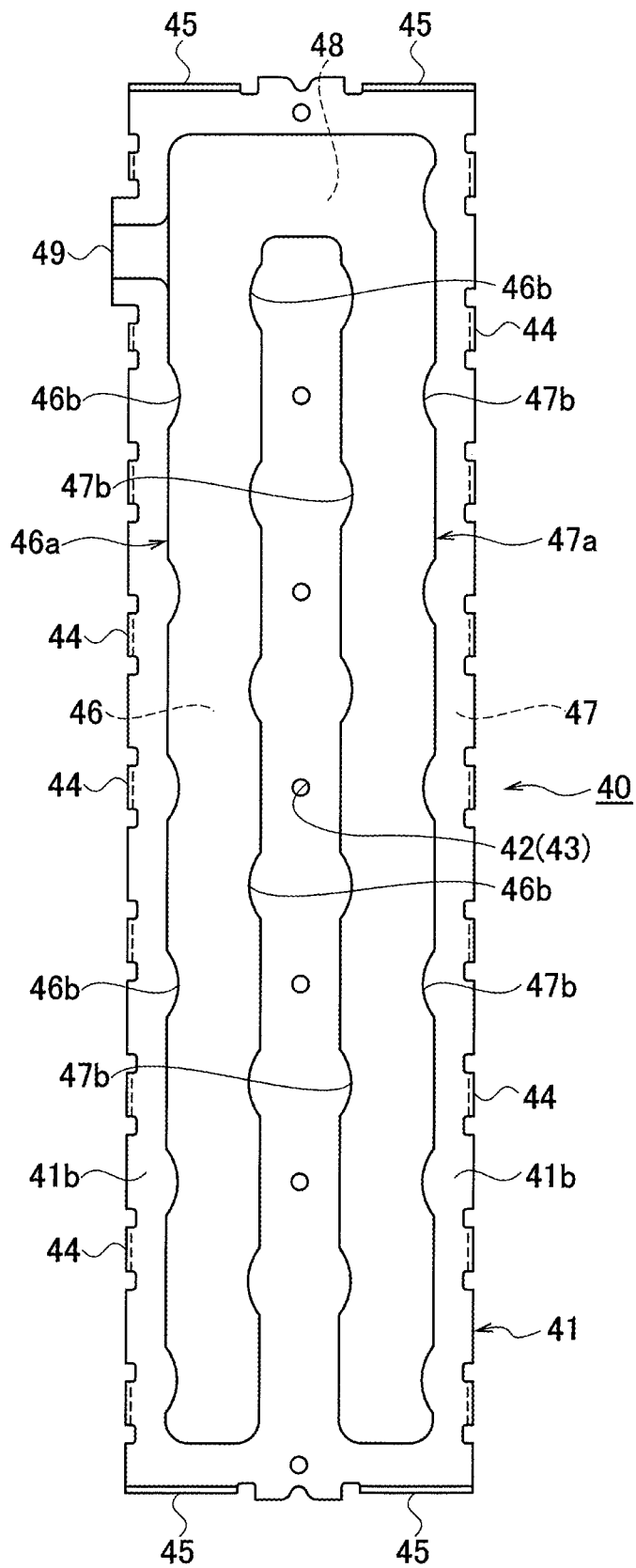
FIG. 12 is a side view illustrating another embodiment of the above-described cold storage material container.

FIG. 12 is a side view illustrating another embodiment of the above-described cold storage material container.

As illustrated in FIG. 12, in the cold storage material container 40 of this another embodiment, a plurality of arc-shaped convexities 46b, 47b protruding inward of the standing walls 46a, 47a of the first and second accommodating concavities 46, 47 are integrally formed with an interval therebetween.

A plurality of arc-shaped convexities 46b, 47b, which protrude inward and are formed at positions, where the standing walls 46a, 47a of each of the accommodating concavities 46, 47 face each other, are formed so as to be disposed in a zigzag manner. Therefore, as with the arc-shaped convexities 46b, 47b protruding outward of the standing walls 46a, 47a illustrated in the FIG. 5 and FIG. 6, the stiffness of the side face 40a of the cold storage material container 40 which is the contact surface with respect to the refrigerant tube 30 can be secured and deformation such as dent, in the side face 40a of the cold storage material container 40 can be reliably prevented.

Figure 13:
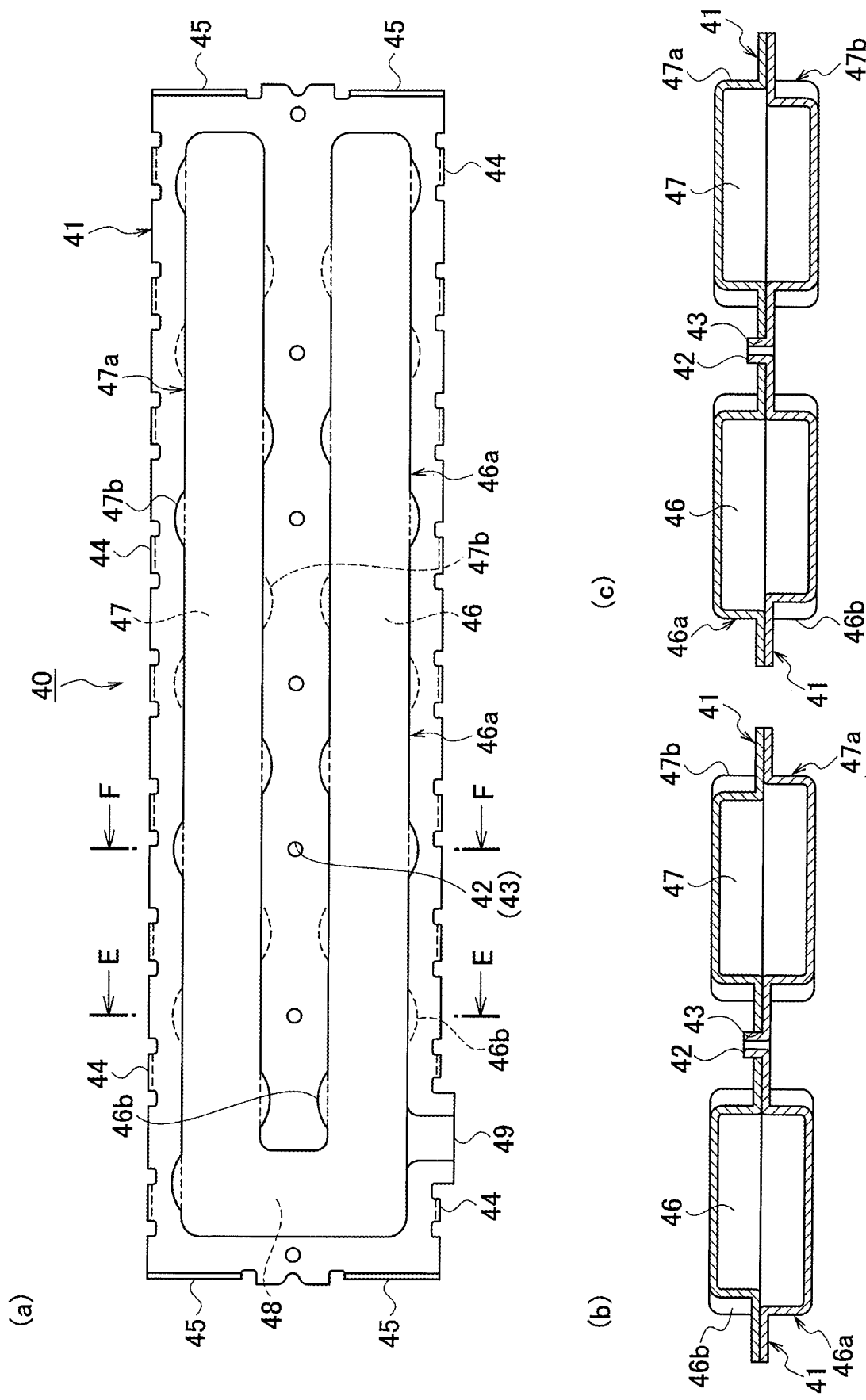
FIG. 13(a) is a side view illustrating an alternative embodiment of the above-described cold storage material container.
FIG. 13(b) is a cross sectional view along an E-E line in FIG. 13(a).
FIG. 13(c) is a cross sectional view along an F-F line in FIG. 13(a).

FIG. 13(a) is a side view illustrating an alternative embodiment of the above-described cold storage material container, FIG. 13(b) is a cross sectional view along an E-E line in FIG. 13(a), and FIG. 13(c) is a cross sectional view along an F-F line in FIG. 13(a).

As illustrated in FIG. 13(a), FIG. 13(b), and FIG. 13(c), in the cold storage material container 40 of this alternative embodiment, a plurality of arc-shaped convexities 46b, 47b, which protrude outward and are formed in the standing walls 46a, 47a of each of the accommodating concavities 46, 47 of one of the pair of cold storage plates 41, and a plurality of the arc-shaped convexities 46b, 47b, which protrude outward and are formed in the standing walls 46a, 47a of each of the accommodating concavities 46, 47 of the other one of the cold storage plates 41, are alternately formed.

A plurality of the arc-shaped convexities 46b, 47b protruding outward of one of the cold storage plates 41 and a plurality of the arc-shaped convexities 46b, 47b protruding outward of the other one of the cold storage plates 41 are alternately formed in this manner. As the result, just with a simple structure in which a plurality of the arc-shaped convexities 46b, 47b protruding outward are alternately formed, the stiffness of the side face 40a of the cold storage material container 40 which is the contact surface with respect to the refrigerant tube 30 can be further secured and deformation such as dent, in the side face 40*a* of the cold storage material container 40 can be reliably prevented.

Figure 14:
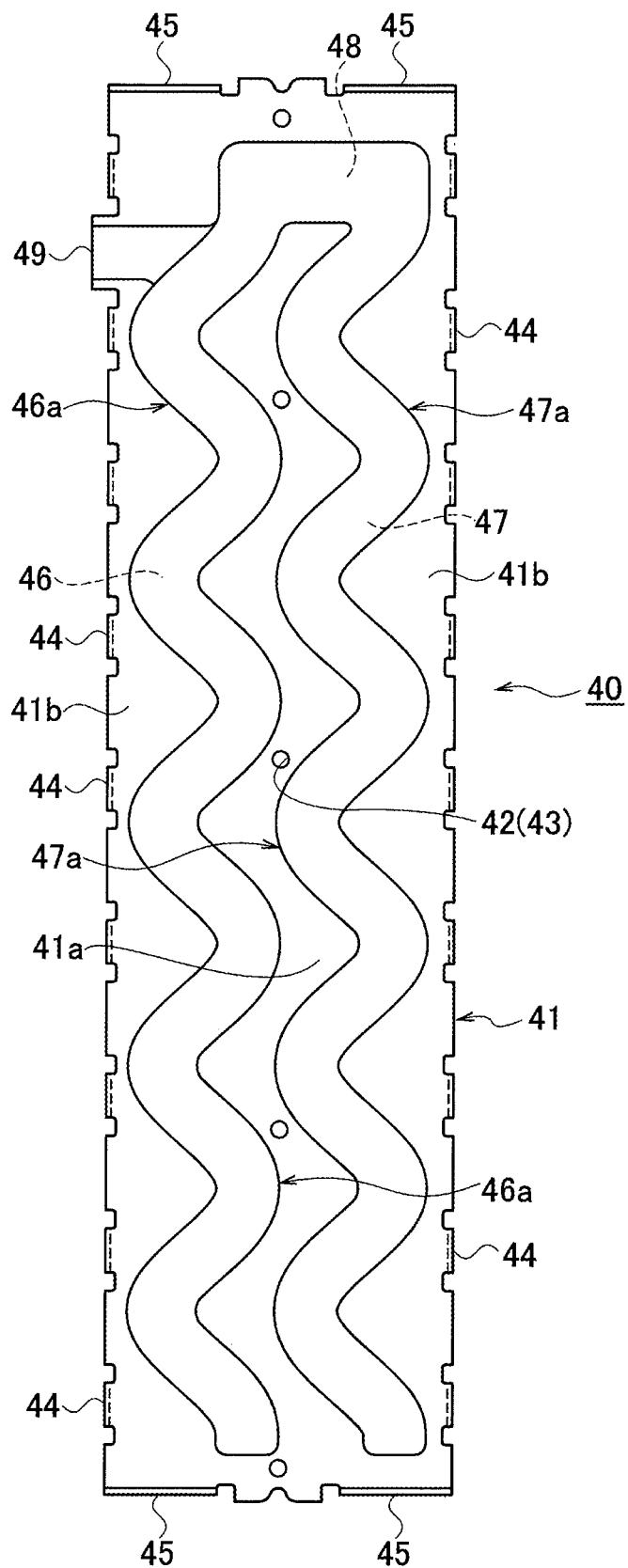
FIG. 14 is a side view illustrating yet another embodiment of the above-described cold storage material container.

FIG. 14 is a side view illustrating yet another embodiment of the cold storage material container.

As illustrated in FIG. 14, in the cold storage material container 40 of this yet another embodiment, the standing walls 46*a*, 47*a* of the first and second accommodating concavities 46, 47 are formed in a wave shape so as to provide the first and second accommodating concavities 46, 47 to meander. With a simple structure in which the first and second accommodating concavities 46, 47 are made to meander, as with the arc-shaped convexities 46*b*, 47*b* protruding outward of the standing walls 46*a*, 47*a* illustrated in the FIG. 5 and FIG. 6 the stiffness of the side face 40*a* of the cold storage material container 40 which is the contact surface with respect to the refrigerant tube 30 can be secured and deformation such as dent, in the side face 40*a* of the cold storage material container 40 can be reliably prevented.

Figure 15:
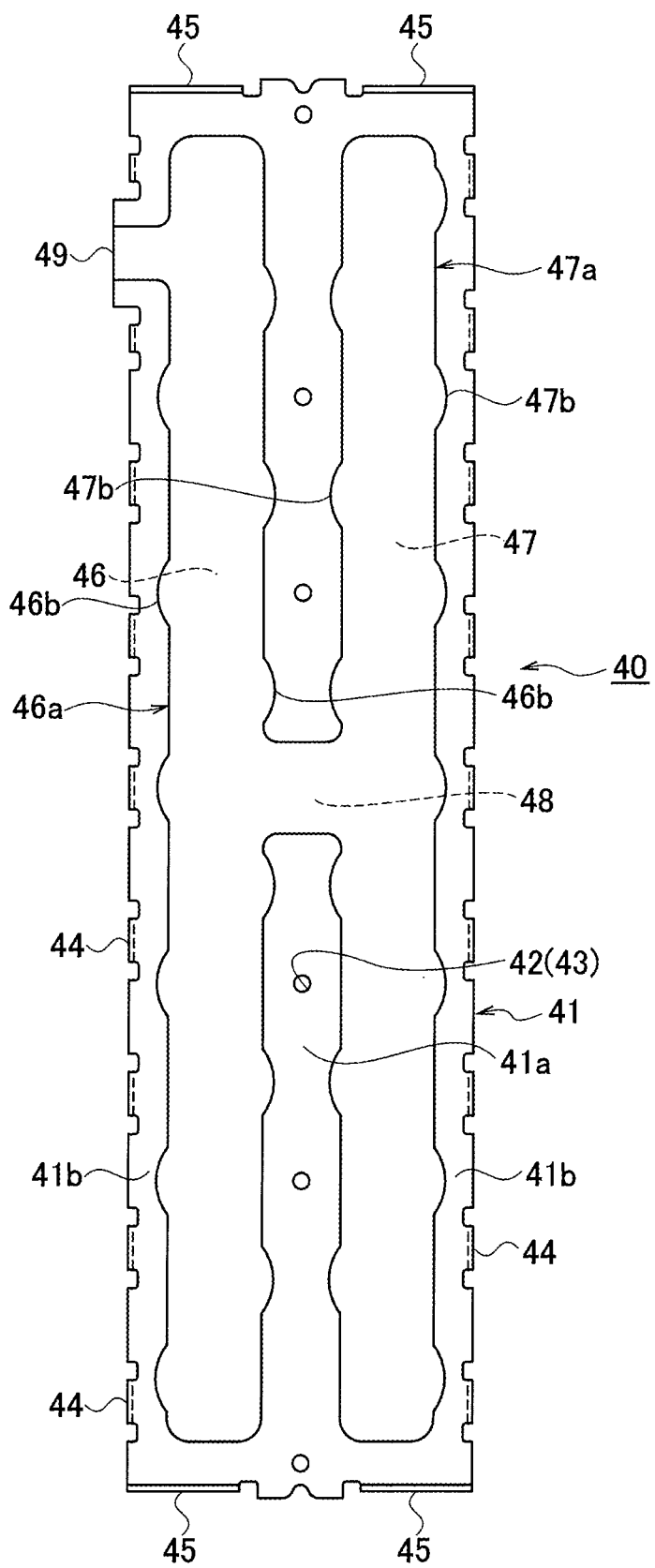
FIG. 15 is a side view illustrating a yet alternative embodiment of the above-described cold storage material container.

FIG. 15 is a side view illustrating a yet alternative embodiment of the cold storage material container.

As illustrated in FIG. 15, in the cold storage material container 40 of this yet alternative embodiment, the first accommodating concavity 46 and the second accommodating concavity 47 are formed in parallel between the pair of cold storage plates 41, 41, and these first accommodating concavities 46 and second accommodating concavity 47 are made to communicate with each other via the communicating section 48 located in the middle. Thus, the cold storage material B can be equally filled in the first accommodating concavity 46 and into the second accommodating concavity 47. Moreover, even if an evaporator is inclined and installed, a height of the liquid level of the cold storage material B filled in the first accommodating concavity 46 and a height of the liquid level of the cold storage material B filled in the second accommodating concavity 47 can be set equal to each other.

Note that, according to each of the above-described embodiments, the first refrigerant flow path is formed on the windward side in the ventilation airflow direction of a refrigerant tube, while the second refrigerant flow path is formed on the leeward side. Furthermore, the first accommodating concavity is formed on the windward side in the ventilation airflow direction of a cold storage material container, while the second accommodating concavity is formed on the leeward side. However, one more refrigerant flow path or accommodating concavity may be added between the windward side and the leeward side.

Note that, according to each of the above-described embodiments, a bending section protruding outward in an L-shape is formed at each of the both ends in the vertical direction of a pair of cold storage plates, as a stopper abutted against each tank forming section on both sides in the vertical direction of a pair of refrigerant plates, but a bending section may be formed only in one of a pair of cold storage plates and the shape thereof is not limited to an L-shape.

Although the embodiments of the present invention have been described above, these embodiments are just as an example to facilitate understanding of the present invention, and the present invention is not limited to these embodiments. The technical scope of the present invention includes not only the specific technical items disclosed in the above-described embodiments but also various variants, modifications, alternative techniques and the like that may be easily derived therefrom.

This application is based upon and claims the benefit of priority from Japanese Patent Application No. 2016-048410, filed on Mar. 11, 2016 and Japanese Patent Application No. 2016-048414, filed on Mar. 11, 2016, the entire content of which are incorporated herein by reference.

INDUSTRIAL APPLICABILITY

According to the present invention, a cold storage material container is formed by superimposing a pair of cold storage plates, each of which includes an accommodating concavity to be filled with a cold storage material, and a plurality of convexities are formed with an interval therebetween in a standing wall of the accommodating concavity of each of the cold storage plates, so that just with a simple structure in which a plurality of convexities are formed in the standing wall, the stiffness of the side face of the cold storage material container which is the contact surface with respect to a refrigerant tube can be secured. Thus, deformation such as dent, in the side face of the cold storage material container can be reliably prevented.

REFERENCE SIGNS LIST

10 evaporator with a cold storage function
20*a*, 21*a* tank forming section
30 refrigerant tube
31, 31 pair of refrigerant plates
32, 33 refrigerant flow path
34 heat exchange facilitator
40 cold storage material container
41, 41 pair of cold storage plates
45 bending section (stopper)
46 first accommodating concavity (accommodating concavity)
46*a* standing wall
46*b* convexity
47 second accommodating concavity (accommodating concavity)
47*a* standing wall
47*b* convexity
48 communicating section
Wa width of cold storage plate
Wb width of refrigerant tube
Wc width of accommodating concavity of cold storage plate
Wd width of refrigerant flow path of refrigerant tube
A refrigerant
B cold storage material

The invention claimed is:
1. An evaporator, comprising:
a plurality of refrigerant tubes which have refrigerant flow paths and which are disposed in parallel with an interval therebetween; and
a cold storage material container sandwiched and bonded between adjacent refrigerant tubes among the plurality of refrigerant tubes and fillable with a cold storage material,
wherein the cold storage material container is formed by superimposing a pair of cold storage plates, each of which includes an accommodating concavity to be filled with the cold storage material,
wherein a plurality of convexities are formed with an interval therebetween in a standing wall of the accommodating concavity of the each of the pair of cold storage plates, and
wherein a width of at least one of the cold storage plates is formed smaller than a width of at least one of the plurality of refrigerant tubes.

2. An evaporator, comprising:
a plurality of refrigerant tubes which have refrigerant flow paths and which are disposed in parallel with an interval therebetween;
a cold storage material container sandwiched and bonded between adjacent refrigerant tubes among the plurality of refrigerant tubes and Tillable with a cold storage material,
wherein the cold storage material container is formed by superimposing a pair of cold storage plates, each of which includes an accommodating concavity to be filled with the cold storage material,
wherein a plurality of convexities are formed with an interval therebetween in a standing wall of the accommodating concavity of the each of the pair of cold storage plates, and
wherein at least one of the plurality of refrigerant tubes includes:
  a pair of tank forming sections formed in a cylindrical shape on both sides in a vertical direction;
  a pair of refrigerant plates having formed therein at least one of the refrigerant flow paths in communication with the pair of tank forming sections by integrally forming and superimposing the pair of tank forming sections; and
  a heat exchange facilitator which is housed in the at least one of the refrigerant flow paths of the pair of refrigerant plates to facilitate heat exchange.

3. The evaporator according to claim 2, wherein
the cold storage material container is formed by superimposing the pair of cold storage plates, each of which includes the accommodating concavity to be filled with the cold storage material, and wherein
a stopper abutted against to each of the pair of tank forming sections on both sides in the vertical direction of the pair of refrigerant plates is formed at each of both ends in a vertical direction of at least one of the pair of cold storage plates.

4. The evaporator according to claim 3, wherein
a bending section formed by bending the both ends in vertical direction of the at least one of the pair of cold storage plates serves as the stopper.

5. An evaporator comprising:
a plurality of refrigerant tubes which have refrigerant flow paths and which are disposed in parallel with an interval therebetween; and
a cold storage material container sandwiched and bonded between adjacent refrigerant tubes among the plurality of refrigerant tubes and fillable with a cold storage material,
wherein the cold storage material container is formed by superimposing a pair of cold storage plates, each of which includes an accommodating concavity to be filled with the cold storage material,
wherein a plurality of convexities are formed with an interval therebetween in a standing wall of the accommodating concavity of the each of the cold storage plates,
wherein in at least one of the pair of cold storage plates, a first accommodating concavity and a second accommodating concavity are formed in parallel in a direction of at least one of the refrigerant flow paths, and
wherein the first accommodating concavity and the second accommodating concavity are made to communicate with each other via a communicating section.

* * * * *